March 1, 1927.
B. W. ROGERS ET AL
1,619,371
RUBBER COVERED ROLL
Filed Feb. 26, 1926
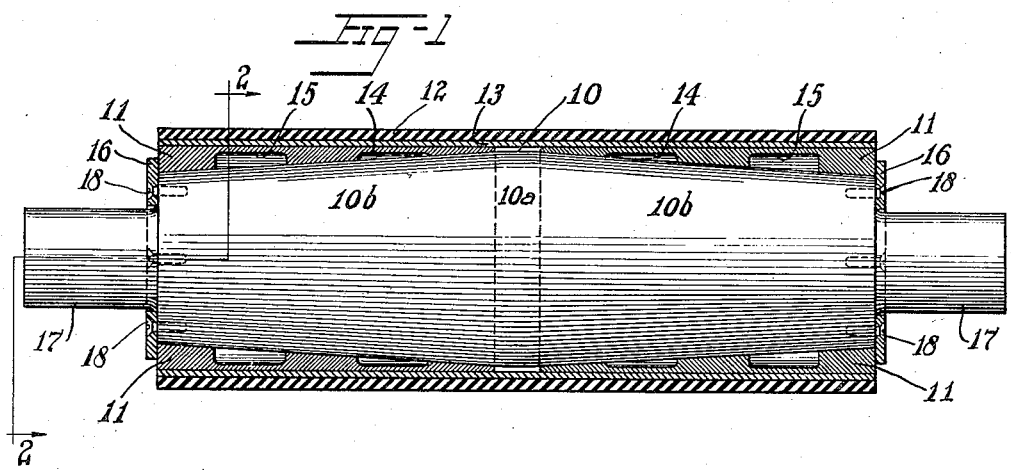
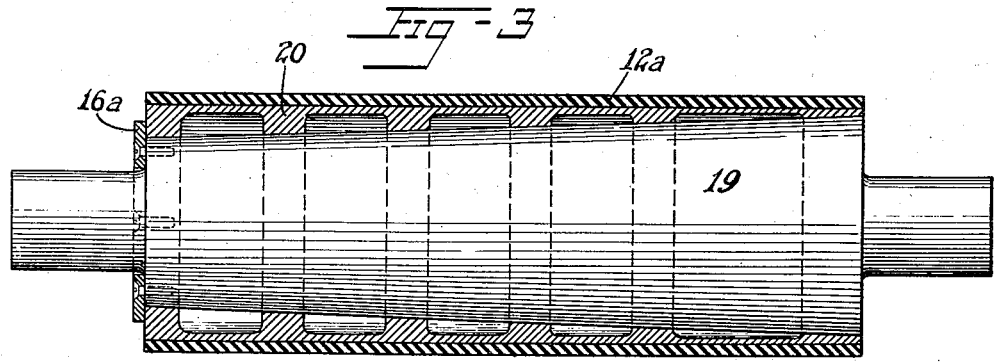
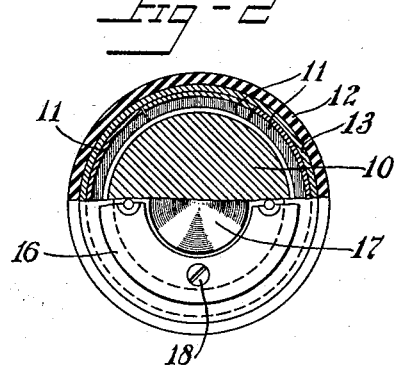
Inventors
Bruce W. Rogers
Walter I. Glass
By Pierson, Eakin & Avery
Attys Patented Mar. 1, 1927.

1,619,371

UNITED STATES PATENT OFFICE.

BRUCE W. ROGERS AND WALTER L. GLASS, OF AKRON, OHIO, ASSIGNORS TO THE B. F. GOODRICH COMPANY, OF NEW YORK, N. Y., A CORPORATION OF NEW YORK.

RUBBER-COVERED ROLL.

Application filed February 26, 1926. Serial No. 90,840.

This invention relates to rubber covered rolls and its chief object is to provide a roll having a rubber cover which readily may be mounted upon and removed from the roll, as for renewal of the rubber cover after wear or deterioration More specific objects are to provide a rubber cover which may be economically manufactured and which may be conveniently secured upon the roll in true cylindrical form.

Of the accompanying drawings:

Fig. 1 is a longitudinal section of a roll and roll cover embodying our invention in its preferred form.

Fig. 2 is a section on line 2, 2, of Fig. 1.

Fig. 3 is a longitudinal section of a modification.

Referring first to Figs. 1 and 2, the embodiment of the invention there shown comprises a roll body 10 formed at its middle with a cylindrical zone 10ª, the roll body being tapered in both directions from the said middle zone to its ends, to provide frusto-conical zones 10ᵇ, 10ᵇ, which coact with respective sets of segmental wedge members 11, 11 interposed between the roll body and the roll cover.

The roll cover comprises a cushion member in the form of a sleeve 12, here shown as a cylindrical sleeve of even thickness, composed of vulcanized rubber or the like, and mounted upon an inextensible, cylindrical sleeve-base 13 and preferably secured thereto by vulcanization, the said base preferably being of metal or other stiff material and of sufficient thickness effectively to bridge such gaps as occur between the segmental wedge members 11 without permitting the roll cover to be drawn out of its true cylindrical form by action of the wedge members or by external pressure applied to the roll.

The wedge members are preferably formed with cylindrical outer faces to fit the cover base 13 and with frusto-conical inner faces to fit the roll body, and they are preferably recessed as at 14 and 15 on their inner faces for lightness and also to reduce the area of surfaces necessary to be accurately faced and to permit slight flexing of the wedge members to compensate for slight imperfection of form.

For securing the respective sets of wedge members 11 in place annular retaining plates 16, 16, surrounding the respective trunnions 17, 17, of the roll, are secured to the end faces of the roll body by screws 18, 18, their outer margins overlapping the end faces of the wedge members.

The rubber sleeve 12, as an alternative to being vulcanized on its base 13, may be first vulcanized and then stretched onto the base 13 in any known or suitable manner, so as to be held thereon by its own tension.

In assembling the parts described the cover assembly, consisting of the rubber sleeve 12 and base 13, is passed onto the roll body from one end thereof, the wedge members 11 and the retaining plates 16 being removed, and the wedge members are then forced into position between the roll body and the cover assembly, urging the cover assembly outward and placing the sleeve-like base 13 under tension, care being taken to advance the wedge members 11 to such relative positions as to true up the cover assembly with relation to the trunnions of the roll, the parts preferably being of such accurate form and size that the outer ends of the wedge members will be flush with the ends of the roll body when the cover assembly is in proper position and properly tensioned, so that the retaining plates 16 may fit snugly against both the roll body and the wedge members. The wedge members may be shoved home by mounting the retaining plates in place and tightening up the screws 18.

In the modification shown in Fig. 3 the roll body, 19, is tapered in one direction only, from end to end of the roll, and the rubber cover 12ª is mounted upon an annular wedge member 20 formed internally with faces adapted to fit the roll body and externally of cylindrical form, the annular form of the wedge member 20 permitting it to take the strain of its own wedge action against the roll body and making unnecessary a separate cover-base such as the member 13 of Fig. 1. In this embodiment only one retaining plate, 16ª, is required.

The invention provides a roll of which the cover may be readily removed for re-surfacing of the rubber or substitution of a new cover, which is of great advantage in the case of large rolls such as the rolls commonly used in paper making machines, which heretofore have commonly required to be sent to a rubber factory for re-surfacing or renewal of their rubber covers.

Further modifications are possible within the scope of the invention as defined in the appended claims.

We claim:

1. A roll comprising a tapered roll body, and an inextensible, annular cover member wedged thereon.

2. A roll comprising a tapered roll body, an inextensible, annular cover member wedged thereon, and a cushion member mounted on the outer face of said inextensible member.

3. A roll comprising a tapered roll body, an inextensible, annular cover member thereon, and a circumferential series of wedge members interposed between the roll body and the cover member.

4. A roll comprising a roll body tapered toward its respective ends, an inextensible, annular cover member mounted thereon and extending over both of the tapered portions of the roll body and respective wedging means interposed between the two tapered portions of the roll body and the cover member.

In witness whereof we have hereunto set our hands this 17th day of February, 1926.

BRUCE W. ROGERS.
WALTER L. GLASS.